United States Patent
Im et al.

(10) Patent No.: US 9,756,793 B2
(45) Date of Patent: Sep. 12, 2017

(54) COMBINED HEAT AND POWER SYSTEM FOR GREENHOUSE CARBON DIOXIDE ENRICHMENT WITH UNIFIED TRANSMISSION PIPES FOR HOT WATER AND CARBON DIOXIDE

(71) Applicant: KOREA INSTITUTE OF ENERGY RESEARCH, Daejeon (KR)

(72) Inventors: Yong Hoon Im, Daejeon (KR); Jae Yong Lee, Seoul (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 0 days.

(21) Appl. No.: 14/404,587

(22) PCT Filed: Aug. 26, 2013

(86) PCT No.: PCT/KR2013/007607
§ 371 (c)(1),
(2) Date: Nov. 28, 2014

(87) PCT Pub. No.: WO2014/181932
PCT Pub. Date: Nov. 13, 2014

(65) Prior Publication Data
US 2016/0057943 A1 Mar. 3, 2016

(30) Foreign Application Priority Data
May 10, 2013 (KR) .................. 10-2013-0053098

(51) Int. Cl.
*A01G 9/18* (2006.01)
*A01G 9/24* (2006.01)
*F24D 10/00* (2006.01)

(52) U.S. Cl.
CPC .............. *A01G 9/18* (2013.01); *A01G 9/245* (2013.01); *F24D 10/00* (2013.01);
(Continued)

(58) Field of Classification Search
CPC .. A01G 9/18; A01G 9/24; A01G 9/245; F24D 2200/18; Y02E 20/14
(Continued)

(56) References Cited

U.S. PATENT DOCUMENTS 4,899,544 A * 2/1990 Boyd .................... F01K 23/103
60/618
5,524,381 A * 6/1996 Chahroudi ............. A01G 9/243
47/17
(Continued)

FOREIGN PATENT DOCUMENTS

JP 2005-137452 6/2005
JP 2010-022331 2/2010
(Continued)

OTHER PUBLICATIONS

The extended European search report issued by the European Patent Office on Mar. 29, 2016.

*Primary Examiner* — Marc Burgess
(74) *Attorney, Agent, or Firm* — IP & T Group LLP

(57) ABSTRACT

A combined heat and power system for greenhouse carbon dioxide enrichment purifies carbon dioxide from exhaust gas of the combined heat and power system generating and supplying power and heat by combusting fuel and supplies the purified carbon dioxide to a greenhouse. The combined heat and power system includes a unified pipe system configured to simultaneously transmit hot water and carbon dioxide through a single pipe by dissolving the purified carbon dioxide in a heat transmission medium, a storage system configured to store the carbon dioxide transmitted to demand destinations along with the hot water, and supply unit configured to supply the carbon dioxide transmitted to and stored in the demand destinations depending on a heat and carbon dioxide load condition of a demand destination.

6 Claims, 5 Drawing Sheets

(52) U.S. Cl.
CPC .. *F24D 2200/18* (2013.01); *F24D 2220/0292* (2013.01); *Y02E 20/14* (2013.01)

(58) Field of Classification Search
USPC .......................................................... 47/17
See application file for complete search history.

(56) References Cited

U.S. PATENT DOCUMENTS

| | | | | |
|---|---|---|---|---|
| 5,659,977 | A * | 8/1997 | Jensen | A01G 33/00 34/547 |
| 6,474,067 | B2 * | 11/2002 | Shishido | B09B 3/00 60/618 |
| 7,789,026 | B2 * | 9/2010 | Traina | F23G 5/006 110/234 |
| 8,950,111 | B2 * | 2/2015 | Soejima | A01G 7/02 47/17 |
| 2008/0000151 | A1 * | 1/2008 | Houweling | A01G 9/246 47/17 |
| 2011/0195473 | A1 * | 8/2011 | Wilhelm | A01G 9/18 435/168 |

FOREIGN PATENT DOCUMENTS

| | | |
|---|---|---|
| KR | 101063372 | 9/1920 |
| KR | 101044375 | 6/2011 |
| KR | 101063372 | 9/2011 |
| KR | 101194168 | 10/2012 |
| WO | WO 2009/038487 | 3/2009 |

* cited by examiner

FIG. 6

| Temperature(℃) | Solubility of CO in water at various partial pressures (Solubility in mole fraction X 1000, pressure in kPa) | | | |
|---|---|---|---|---|
| | 50 | 101.325 | 200 | 500 |
| 0 | 0.671 | 0.355 | 2.66 | 6.52 |
| 10 | 0.477 | 0.963 | 1.89 | 4.65 |
| 20 | 0.353 | 0.713 | 1.400 | 3.45 |
| 25 | 0.308 | 0.622 | 1.223 | 3.01 |
| 30 | 0.271 | 0.548 | 1.077 | 2.66 |
| 40 | 0.216 | 0.437 | 0.858 | 2.12 |
| 50 | 0.178 | 0.359 | 0.706 | 1.75 |
| 60 | 0.150 | 0.304 | 0.598 | 1.480 |
| 70 | 0.131 | 0.264 | 0.520 | 1.288 |
| 80 | 0.116 | 0.236 | 0.463 | 1.148 |
| 90 | 0.106 | 0.214 | 0.422 | 1.046 |
| 100 | 0.098 | 0.199 | 0.391 | 0.971 |
| 110 | 0.093 | 0.188 | 0.370 | 0.917 |
| 120 | 0.089 | 0.180 | 0.354 | 0.880 |
| 130 | 0.086 | 0.175 | 0.345 | 0.856 |
| 140 | 0.085 | 0.172 | 0.339 | 0.844 |
| 150 | 0.085 | 0.172 | 0.338 | 0.841 |
| 160 | 0.085 | 0.173 | 0.340 | 0.846 |

COMBINED HEAT AND POWER SYSTEM FOR GREENHOUSE CARBON DIOXIDE ENRICHMENT WITH UNIFIED TRANSMISSION PIPES FOR HOT WATER AND CARBON DIOXIDE

This application is a national stage application of PCT/KR2013/007607 filed on Aug. 26, 2013, which claims priority of Korean patent application number 10-2013-0053098 filed on May 10, 2013. The disclosure of each of the foregoing applications is incorporated herein by reference in its entirety.

TECHNICAL FIELD

The present invention relates to a combined heat and power system for greenhouse carbon dioxide enrichment with unified transmission pipes for hot water and carbon dioxide, and more particularly, to a combined heat and power system for greenhouse carbon dioxide enrichment with unified transmission pipes for hot water and carbon dioxide capable of improving greenhouse cultivation capability by collecting greenhouse gases generated at the time of operating a heat source in the combined heat and power system which generates and supplies heat and electric energy and supplying the collected greenhouse gases to a greenhouse and providing an economical carbon dioxide supply system targeting a plurality of greenhouses which are at a long distance by dissolving the collected carbon dioxide in hot water and then utilizing the dissolved carbon dioxide to be fitted for transmission and purpose.

BACKGROUND ART

Generally, carbon dioxide enrichment is a cultivation method which may accelerate growth and improve quality by artificially increasing a concentration of carbon dioxide in the air at the time of crop cultivation.

Carbon dioxide is an essential component for photosynthetic reaction of plants. Accordingly, to promote the active photosynthetic reaction, there is a need to supplement carbon dioxide using carbon dioxide enrichment.

In particular, in a facility specifically utilized for horticulture cultivation, which is performed in a space, such as a house, in which ventilation is not consistent, photosynthesis is highly likely to be limited due to a lack of carbon dioxide, and as a result, it essential to promote carbon dioxide enrichment.

As a method for supplying carbon dioxide, a method for installing a liquefied carbon dioxide gas tank outside the house, increasing temperature using a vaporizer, and supplying the carbon dioxide into the house has been used, which may lead to an increase in installation costs and price.

Therefore, a method for supplying carbon dioxide using as combined heat and power (CHP) system which may maximize resource utilization by producing heat and electricity along with carbon dioxide and using the generated heat and electricity for greenhouse heating and power supply has been recently received attention.

A typical carbon dioxide enrichment technology based on the combined heat and power generation configures a system in which supply pipes of hot water and carbon dioxide are separated from each other to increase transmission efficiency of carbon dioxide when a heat source is positioned near a greenhouse which is a supply target.

That is, the typical carbon dioxide enrichment technology is to enrich heat, electricity, and enrich carbon dioxide which are mainly limited to the greenhouse since the heat source is positioned near the greenhouse, thereby maximizing annual operation efficiency based on following operations fitted for loads (heat, electricity, and carbon dioxide) of the greenhouse.

Further, the existing carbon dioxide enrichment system uses a separate storage tank in which the hot water is stored and includes a buffer apparatus which may solve imbalance between demand and supply due to the heat load of the greenhouse, but uses a method for supplying generated carbon dioxide to a greenhouse without using the separate storage tank, emitting the carbon dioxide into the atmosphere when the concentration of greenhouse carbon dioxide is unnecessarily increased, or if necessary, the separate carbon dioxide storage tank is installed to be able to control the concentration of carbon dioxide in the green house to cope with the imbalance between demand and supply of the carbon dioxide efficiently. However, generally the existing carbon dioxide enrichment system does not use a separate carbon dioxide storage apparatus due to the cost effectiveness.

As such, the typical combined heat and power system which targets the carbon dioxide enrichment system targeting a plurality of greenhouses which are at a long distance or are spaced apart from each other at a distance may increase pipe costs and power required for transmission of corresponding media when supplying pipe network of hot water and carbon dioxide are separated from each other.

DISCLOSURE

Technical Problem

The present invention relates to a combined heat and power system for greenhouse carbon dioxide enrichment with unified transmission pipes for hot water and carbon dioxide, and in particular, an object of the present invention is to provide an economical carbon dioxide supply system capable of improving greenhouse cultivation capability by collecting greenhouse gases generated at the time of operating a heat source in the combined heat and power system which generates and supplies heat and electric energy and supplying the collected greenhouse gases to a greenhouse and of providing an economical carbon dioxide supply system targeting a plurality of greenhouses which are at a long distance by dissolving the collected carbon dioxide in hot water and then utilizing the dissolved carbon dioxide to be fitted for transmission and purpose.

Technical Solution

An exemplary embodiment of the present invention provides a combined heat and power system for greenhouse carbon dioxide enrichment which purifies carbon dioxide from exhaust gas of the combined heat and power system generating and supplying power and heat by combusting fuel and supplies the purified carbon dioxide to a greenhouse, the combined heat and power system including: a unified pipe system configured to dissolve the purified carbon dioxide in a heat transmission medium to simultaneously transmit hot water and carbon dioxide through a single pipe; a storage system configured to store the carbon dioxide transmitted to demand destinations along with the hot water; and a supply means configured to supply the carbon dioxide transmitted to and stored in the demanded destinations depending on a heat and carbon dioxide load condition of demand destination.

The combined heat and power system may further include: a combined heat and power generation unit configured to include a combustor which combusts the fuel and a power generator which generates power by combustion in the combustor a heat exchanger configured to heat the hot water by heat generated from a power generator of the combined heat and power generation unit; a hot water pipe configured to supply the hot water which produced by the heat exchange in the heat exchanger, to the greenhouse; a booster pump configured to be equipped in the hot water pipe to press the hot water so as to increase solubility of the carbon dioxide generated from the combined heat and power generation unit; an exhaust gas treating unit configured to be connected to the heat exchanger and the hot water pipe to treat exhaust gas generated from the combined heat and power generation unit; a compressor configured to press the purified carbon dioxide in the exhaust gas treating unit; a three way valve configured to be connected to the hot water pipe to control a recovery and enrichment amount of the carbon dioxide; and a heater configured to be equipped in the greenhouse and connected to the three way valve to heat the greenhouse.

The combined heat and power system may further include: a heat storage tank configured to be connected to the three way valve to store the hot water in which the carbon dioxide is dissolved.

The heat storage tank may further include a pressure controller which controls an internal pressure thereof to control the solubility of carbon dioxide of the hot water stored in the heat storage tank.

The greenhouse may include an injector connected to the heat storage tank provided therein to inject the hot water in which the carbon dioxide is dissolved into the greenhouse.

The greenhouse may include a air blower connected to the heat storage tank provided therein to supply the carbon dioxide into the greenhouse.

The heat storage tank may be connected to a control unit to control the pressure controller, the injector, and the air blower.

The combined heat and power system may further include: a power supply line configured to directly connect the combined heat and power generation unit with the greenhouse to operate a lighting apparatus which is equipped in the greenhouse using predetermined power generated from the combined heat and power generation unit.

Advantageous Effects

As described above, according to the exemplary embodiments of the present invention, it is possible to save facility costs and power costs for transmission by transmitting carbon dioxide and hot water using the unified system and improve the operation efficiency and the marketability by applying the combined heat and power system to various buildings in addition to the greenhouse.

DESCRIPTION OF DRAWINGS

FIG. 6 is a table showing a real change example in solubility of carbon dioxide depending, on a change in a temperature and pressure condition.

BEST MODE

Exemplary embodiments of the present invention will be described in detail with reference to the accompanying drawings.

Figure 1:
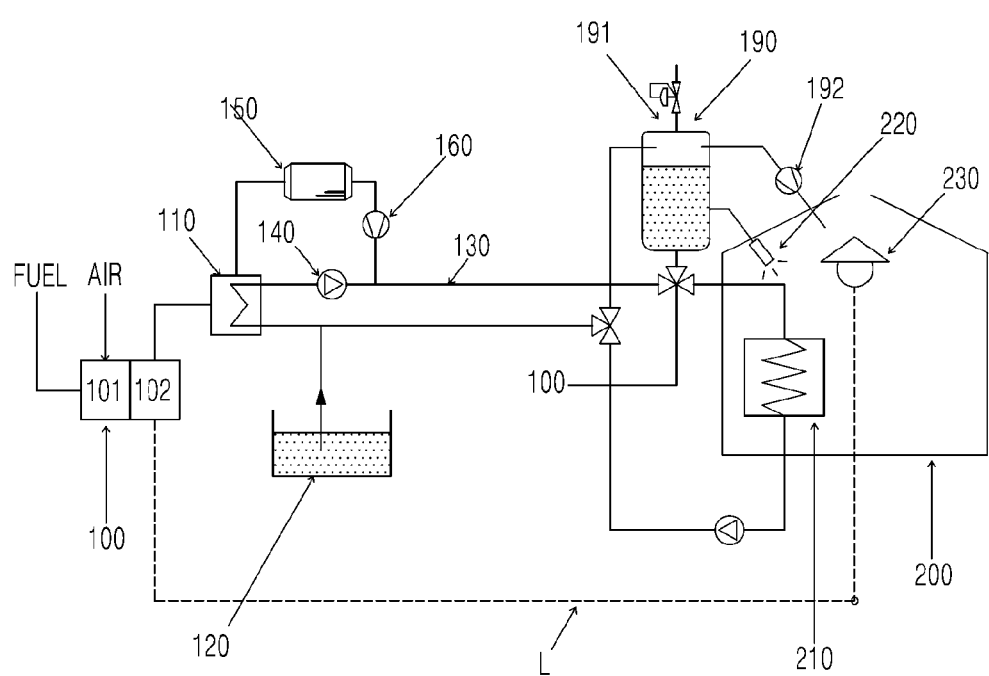
FIG. 1 is a diagram illustrating a combined heat and power system for greenhouse carbon dioxide enrichment according to an exemplary embodiment of the present invention.
Figure 2:
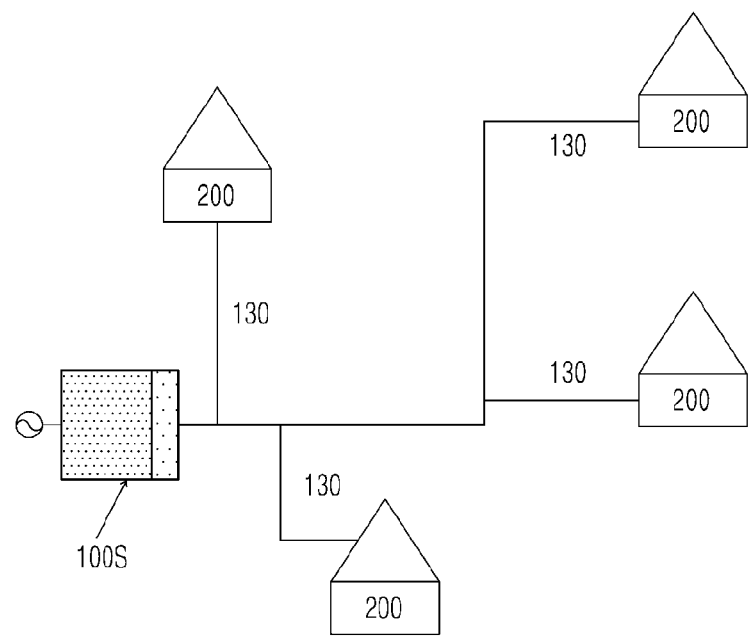
FIGS. 2 and 3 are diagrams illustrating a combined heat and power system for greenhouse carbon dioxide enrichment according to another exemplary embodiment of the present invention.
Figure 3:
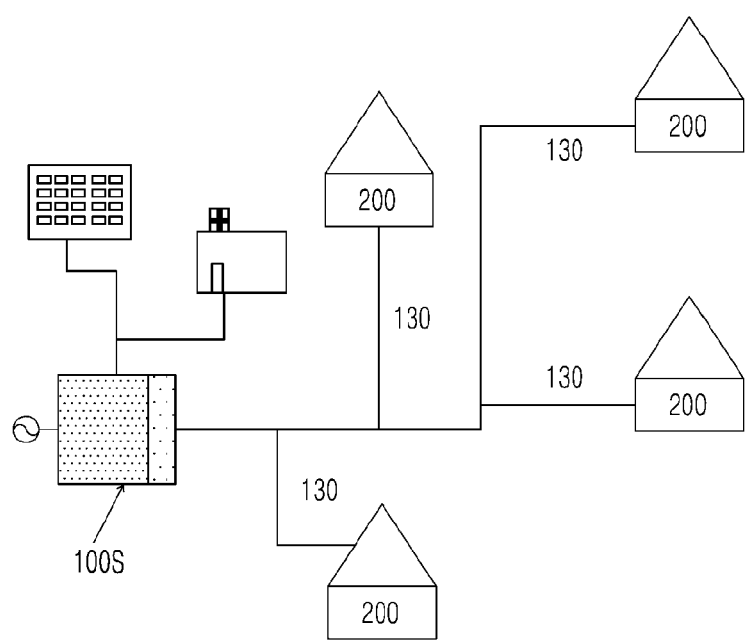

As illustrated in FIGS. 1 to 3, a combined heat and power system 100S for greenhouse carbon dioxide enrichment according to an exemplary embodiment of the present invention is based on a combined heat and power system for greenhouse carbon dioxide enrichment which purifies carbon dioxide from exhaust gas of the combined heat and power system which generates and supplies power and heat by combusting fuel and supplies the purified carbon dioxide to a greenhouse and includes a unified pipe system 130 which transmits hot water and carbon dioxide through a single pipe, a storage system 190 which stores the carbon dioxide along with the hot water, and supply means 192 and 220 which supplies carbon dioxide.

The unified pipe system 130 is configured to dissolve the purified carbon dioxide in a heat transmission medium and simultaneously transmit hot water and carbon dioxide through a single pipe.

The storage system 190 may store the carbon dioxide transmitted to demand destinations along with the hot water.

The supply means 192 and 220 may supply carbon dioxide which is transmitted to and stored in the demand destinations depending on a heat and carbon dioxide load condition of the demand destinations.

Further, the combined heat and power system 100S according to the exemplary embodiment of the present invention may further include: a combined heat and power generation unit 100 which generates power by combustion, a heat exchanger 110 which heats hot water, a hot water pipe (not illustrated) which supplies the hot water to a greenhouse 200, a booster pump 140 which increases solubility of carbon dioxide, an exhaust gas treating unit 150 which treats exhaust gas generated at the time of combustion, a compressor 160 which presses carbon dioxide, as three way valve 170 which controls a recovery and enrichment of carbon dioxide, and a heat exchanger 210 which heats the greenhouse 200.

As illustrated in FIG. 1, the combined heat and power generation unit 100 is configured to include a combustor 101 which combusts fuel and a power generator 102 which generates power using shaft power which is generated by combustion in the combustor 101.

In this case, the combustor 101 receives air as an oxidizing agent and combusts the air together with fuel and generates heat energy during the combustion and emits exhaust gas after the combustion.

Meanwhile, as the combined heat and power generator (or prime mover), a gas engine, a gas turbine, and the like are used.

The heat exchanger 110 heats hot water with heat which is generated from the combined heat and power generation unit 100.

Here, the heat exchanger 110 may be configured to be connected to a separate water supply tank 120 through a pipe to supply water to the combined heat and power system according to the exemplary embodiment of the present invention.

First, the hot water pipe (not illustrated) is connected to the unified pipe system 130 to exchange heat in the heat exchanger 110 and supplies the heated hot water to the greenhouse 200.

In connection with this at the time of configuring the system targeting the plurality of greenhouses 200 which are at a long distance, when supply chains of power, hot water, and carbon dioxide are independently configured, the system has a problem in that facility costs and operation costs may be increased. However, as illustrated in FIG. 2, the present invention transmits the hot water and the carbon dioxide through the single pipe and uses the hot water and the carbon dioxide to supplement the disadvantages of the existing system.

Further, as illustrated in FIG. 3, even when the present invention is operated by being linked with other buildings (for example, apartments, officetels, hospitals, and the like) having different characteristics from the greenhouse 200, the carbon dioxide may be effectively transmitted, stored, and utilized in the greenhouse 200 and buildings.

The booster pump 140 which is equipped in the hot water pipe increases the solubility of carbon dioxide generated from the combined heat and power generation unit 100 while pressing the hot water transmitted from the heat exchanger 110.

The exhaust gas treating unit 150 is connected to the heat exchanger 110 and the hot water pipe to treat the exhaust gas which is generated from the combined heat and power generation unit 100.

The compressor 160 compresses the carbon dioxide purified in the exhaust gas treating unit 150.

The three way valve 170 controls a recovery and enrichment amount of carbon dioxide and has one side connected to the hot water pipe to receive the hot water in which the carbon dioxide is dissolved, another side connected to the heat exchanger 210 which is equipped in the greenhouse 200 to control a heating load and the enrichment amount, and the other side connected to a heat storage tank 190 to be described below.

The heat exchanger 210 is equipped in the greenhouse 200 and is connected to the three way valve 170 and may heat the greenhouse 200.

Meanwhile, the heat storage tank is connected to the heat storage system 190 and the three way valve 170 to store the hot water in which the carbon dioxide is dissolved and immediately exchanges heat when the hot water in which the carbon dioxide is dissolved is transmitted up to the greenhouse 200 when a heat load is present in the greenhouse 200 to heat the greenhouse 200. In this case, the hot water passing through the heat exchanger 210 still includes the carbon dioxide and is transmitted to the heat storage tank and stored in the heat storage tank to use the dissolved carbon dioxide. Here, the temperature of hot water is reduced by passing through the heat exchanger 210 and thus the solubility of carbon dioxide is increased. However, when the use of hot water including newly transmitted carbon dioxide is unnecessary, the hot water is stored in the heat storage tank, and thus is appropriately used when the heat load and the carbon dioxide use load occur later.

Further, the heat storage tank may include a pressure controller 191 which may control an internal pressure thereof to control the solubility of carbon dioxide of hot water stored in the heat storage tank.

That is, the heat storage tank is configured to control the pressure using the pressure controller 191, and thus may control the solubility of hot water of carbon dioxide to appropriately control the storage state of the required carbon dioxide in the greenhouse 200.

A means to supply the carbon dioxide to the greenhouse 200 is configured in plural and when the carbon dioxide which is present in a gaseous state by being separated from the hot water by controlling the internal pressure of the heat storage tank is sufficient, includes an injector 220 which supplies the hot water inside the heat storage tank into the greenhouse 200 as a means which may supply the carbon dioxide to the greenhouse 200 through a air blower 192 or simultaneously control humidity in the greenhouse 200 and a concentration of carbon dioxide.

As such, the greenhouse 200 includes the injector 220 connected to the heat storage tank provided therein to inject the hot water in which the carbon dioxide is dissolved into the greenhouse 200.

Further, the greenhouse 200 includes the air blower 192 which is connected to the heat storage tank provided therein to supply the carbon dioxide into the greenhouse 200.

In this case, the heat storage tank may be connected to a control unit to control the pressure controller 191, the injector 220, and the air blower 192.

Further, a hot water return pipe system may be provided to transmit the hot water passing through the heat exchanger 210 to the storage apparatus to use the dissolved carbon dioxide later, thus using the hot water as described above, or again transmit the hot water to the combined heat and power generation unit through a return pipe, which can be reheated, and the make-up water from water supply tank (120) is desired to be supplemented to return pipe as much as the amount of hot water which is transmitted to the storage apparatus in order to meet the mass conservation in the pipe network.

Meanwhile, a power supply line L is provided, to directly connect the combined heat and power generation unit 100 with the greenhouse 200 to operate a lighting apparatus 230 and separate facilities which are equipped in the greenhouse 200 using predetermined power generated from the combined heat and power generation unit 100.

Figure 4:
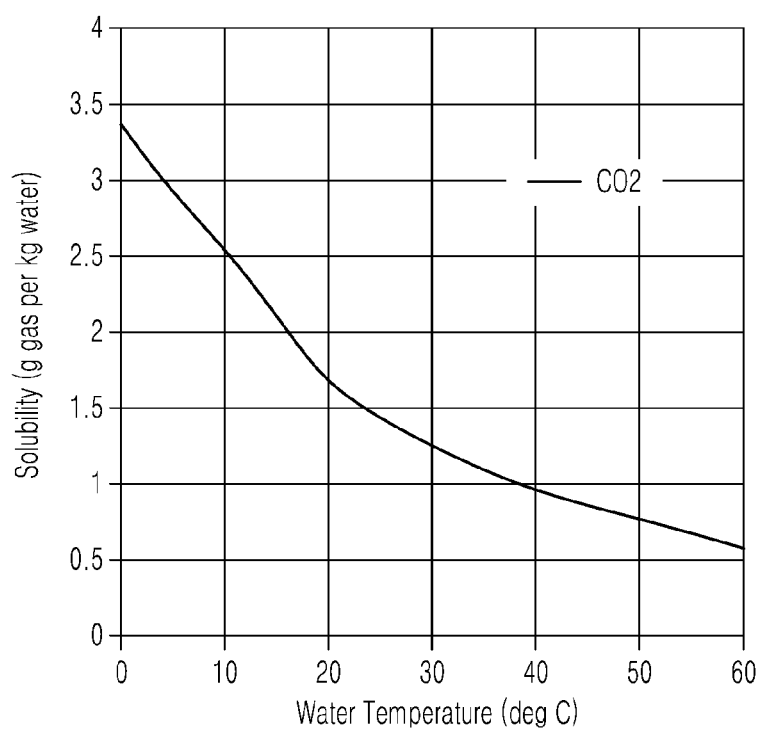
FIGS. 4 and 5 are graphs illustrating a change state in solubility of carbon dioxide depending on temperature and pressure.
Figure 5:
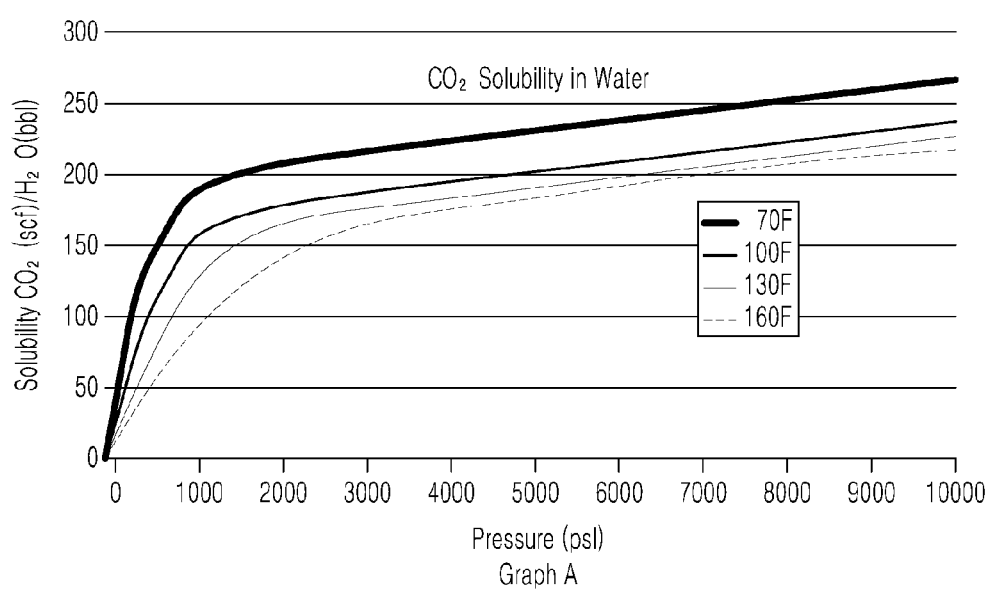

As such, according to the exemplary embodiment of the present invention, pure carbon dioxide generated through the exhaust as treating unit 150 which purifies the carbon dioxide of the exhaust gas using physical properties of the carbon dioxide is dissolved in the hot water and then is transmitted, to the greenhouse 200 through a single pipe system. As illustrated in FIGS. 4 to 6, the solubility of carbon dioxide is generally reduced as the temperature of water (hot water) is increased depending on a temperature and pressure condition but the solubility of carbon dioxide is increased as the pressure is increased, such that the hot water and the carbon dioxide may be simultaneously transmitted to the greenhouse 200 using the characteristics that the physical properties of the solubility of carbon dioxide depending on the temperature and the pressure conflict with each other.

In connection with this, generally, the solubility index is 0.437 when the hot water is 40° C. at 1 atmosphere (101.325 kPa) and the solubility is reduced to a half or less at 90° C. since the solubility is reduced as the temperature is increased under the same pressure, but the solubility is 2.12 under the hot water condition of 40° C. and 5 atmospheres (500 kPa) and therefore is 4.85 times as large as solubility at a 1 atmosphere condition and the solubility is maintained at about two times as large as the solubility even under the hot water condition of 5 atmospheres and 110° C.

Therefore, according to the exemplary embodiment of the present invention, after hot water having a proper temperature (for example, 45° C. to 90° C.) which is generated by waste heat generated from the combined heat and power generation unit 100, which is the heat source, is pressed by the booster pump 140 to increase the solubility of carbon dioxide so as to sufficiently dissolve the carbon dioxide separated from the exhaust gas and then transmit the dissolved carbon dioxide up to the greenhouse 200, which is at a long distance, through the hot water pipe, the carbon dioxide is immediately supplied to the greenhouse 200 by an appropriate supply method when the carbon dioxide load is present in the greenhouse 200 and the carbon dioxide is stored in the hot water storage tank in the form that the carbon dioxide is dissolved in the hot water when the carbon dioxide dissolved in the transmitted hot water needs not be immediately supplied since the concentration of carbon dioxide inside the greenhouse 200 is high, and then the carbon dioxide is supplied to the greenhouse 200 by an appropriate means when a demand is generated later.

As a result, the exemplary embodiment of the present invention is configured to include the unified pipe system 130, the storage system 190, and the supply means 192 and 220, and therefore includes the booster pump 140 which increases the solubility of carbon dioxide using the solution characteristics, that is, the characteristics in which the solubility of carbon diode is increased with the increase of pressure, the hot water pipe through which the hot water pressed for long distance transmission may be transmitted, the heat storage tank which is equipped in the greenhouse 200 to store the hot water transmitted under the pressing condition, the pressure controller 191 which is equipped in the heat storage tank and may keep a predetermined pressure as needed, the control unit which may control the pressure of the pressure controller 191, the air blower 192 which controls the solubility of hot water by controlling the internal pressure of the heat storage tank using the control unit to supply the greenhouse gases emitted inside and outside the heat storage tank to the greenhouse 200, in excess of the maximally acceptable solubility under the corresponding pressure condition, or the injector 220 which directly injects the hot water in which the carbon dioxide is dissolved into the greenhouse 200 to control the carbon dioxide and the indoor humidity, whereby the carbon dioxide dissolved in the hot water is simultaneously stored in the heat storage tank in which the hot water is stored and then, if necessary, the carbon dioxide is supplied to the greenhouse 200 by the appropriate means, thereby solving the operation problem which occurs at the time of the imbalance between demand and supply by storing the carbon dioxide without the separate carbon dioxide dedicated tank as compared with the existing method.

Hereinabove, although the present invention has been described with reference to limited exemplary embodiments and the accompanying drawings, the present invention is not limited thereto, but may be variously modified and altered by those skilled in the art to which the present invention pertains without departing from the spirit and scope of the present invention claimed in the following claims.

The invention claimed is:

1. A combined heat and power system for greenhouse carbon dioxide enrichment which purifies carbon dioxide from exhaust gas of the combined heat and power system generating and supplying power and heat by combusting fuel and supplies the purified carbon dioxide to a greenhouse, the combined heat and power system comprising:
    a unified pipe system configured to dissolve the purified carbon dioxide in a heat transmission medium to simultaneously transmit hot water and carbon dioxide through a single pipe;
    a storage system configured to store the carbon dioxide and the hot water in which the carbon dioxide is dissolved transmitted to demand destinations;
    a supply means configured to supply the carbon dioxide transmitted to and stored in the demand destinations depending on a heat and carbon dioxide load condition of a demand destination;
    a combined heat and power generation unit configured to include a combustor which combusts the fuel and a power generator which generates power by combustion in the combustor;
    a heat exchanger configured to heat the hot water by heat generated from a power generator of the combined heat and power generation unit;
    a hot water pipe configured to supply the hot water which is produced by the heat exchange in the heat exchanger, to the greenhouse;
    a booster pump configured to be equipped in the hot water pipe to press the hot water so as to increase solubility of the carbon dioxide generated from the combined heat and power generation unit;
    an exhaust gas treating unit configured to treat exhaust gas generated from the combined heat and power generation unit;
    a compressor configured to press the purified carbon dioxide in the exhaust gas treating unit;
    a three way valve configured to be connected to the hot water pipe to control a recovery and enrichment amount of the carbon dioxide;
    a heater configured to be equipped in the greenhouse and connected to the three way valve to heat the greenhouse;
    a heat storage tank configured to be connected to the three way valve to store the hot water in which the carbon dioxide is dissolved,
    wherein the heat storage tank further includes a pressure controller which controls an internal pressure thereof to control the solubility of carbon dioxide of the hot water stored in the heat storage tank.

2. The combined heat and power system of claim 1, wherein the greenhouse includes an injector connected to the heat storage tank provided therein to inject the hot water in which the carbon dioxide is dissolved into the greenhouse.

3. The combined heat and power system of claim 2, wherein the heat storage tank is connected to a control unit to control the pressure controller, the injector, and the air blower.

4. The combined heat and power system of claim 1, wherein the greenhouse includes an air blower connected to the heat storage tank provided therein to supply the carbon dioxide into the greenhouse.

5. The combined heat and power system of claim 1, wherein the heat storage tank is connected to a control unit to control the pressure controller, the injector, and the air blower.

6. The combined heat and power system of claim 1, further comprising:
    a power supply line configured to directly connect the combined heat and power generation unit with the greenhouse to operate a lighting apparatus which is equipped in the greenhouse using predetermined power generated from the combined heat and power generation unit.

\* \* \* \* \*

UNITED STATES PATENT AND TRADEMARK OFFICE
CERTIFICATE OF CORRECTION

PATENT NO.        : 9,756,793 B2
APPLICATION NO.   : 14/404587
DATED             : September 12, 2017
INVENTOR(S)       : Yong Hoon Im et al.

It is certified that error appears in the above-identified patent and that said Letters Patent is hereby corrected as shown below:

Delete the following foreign reference in Foreign Patent Documents section:

"KR     101063372     9/1920"

Amend the Claim section as follows:

3. The combined heat and power system of claim 2, wherein the heat storage tank is connected to a control unit to control the pressure controller, the injector, and an air blower to supply the carbon dioxide into the greenhouse.

5. The combined heat and power system of claim 4, wherein the heat storage tank is connected to a control unit to control the pressure controller, the injector, and the air blower.

Signed and Sealed this
Twenty-eighth Day of November, 2017

Joseph Matal
*Performing the Functions and Duties of the*
*Under Secretary of Commerce for Intellectual Property and*
*Director of the United States Patent and Trademark Office*